(12) United States Patent
Tseng et al.

(10) Patent No.: US 12,510,141 B1
(45) Date of Patent: Dec. 30, 2025

(54) ELECTRIC ACTUATOR

(71) Applicant: TOYO AUTOMATION CO., LTD., Tainan (TW)

(72) Inventors: Kun-Cheng Tseng, Tainan (TW); Chuang-Jun Zhang, Tainan (TW)

(73) Assignee: TOYO AUTOMATION CO., LTD., Tainan (TW)

( * ) Notice: Subject to any disclaimer, the term of this patent is extended or adjusted under 35 U.S.C. 154(b) by 0 days.

(21) Appl. No.: 18/917,379

(22) Filed: Oct. 16, 2024

(30) Foreign Application Priority Data

Aug. 8, 2024 (TW) .................................. 113129744

(51) Int. Cl.
*F16H 25/20* (2006.01)
*F16H 25/24* (2006.01)

(52) U.S. Cl.
CPC .................... *F16H 25/24* (2013.01)

(58) Field of Classification Search
CPC .............. F16H 25/24; F16H 25/2472; F16H 2025/249; F16H 2025/2242; F16H 25/2247; F16H 25/2252
See application file for complete search history.

(56) References Cited

U.S. PATENT DOCUMENTS

2019/0284861 A1* 9/2019 Goto ..................... B60J 5/106

FOREIGN PATENT DOCUMENTS

CN 206513187 U * 9/2017
DE 102013003830 A1 * 9/2014 .............. B60J 5/101

* cited by examiner

*Primary Examiner* — Zakaria Elahmadi
(74) *Attorney, Agent, or Firm* — MUNCY, GEISSLER, OLDS & LOWE, P.C.

(57) ABSTRACT

An electric actuator includes an outer cylinder, a sliding unit and a screw shaft. At least one guiding groove is provided in a hole wall of the outer cylinder. The sliding unit includes a nut member, a rotation-restricting member engaged on a first end of the nut member, and an output shaft engaged on a second end of the nut member. The rotation-restricting member has at least one guiding block movably combined in the guiding groove of the outer cylinder. The screw shaft is connected with the nut member in a relatively movable manner. When the screw shaft rotates, the nut member, the rotation-restricting member and the output shaft move with respect to the screw shaft, and the guiding block of the rotation-restricting member moves inside the guiding groove, so as to restrict the nut member and the output shaft from rotating relative to the outer cylinder.

8 Claims, 10 Drawing Sheets

ELECTRIC ACTUATOR

BACKGROUND OF THE INVENTION

1. Field of the Invention

The present invention relates to an electric actuator and, more particularly, to a sliding unit for an electric actuator.

2. Description of the Related Art

Conventional electric actuators or slide devices are widely used in industrial machines and generally employ a motor to drive a screw shaft, so that the load end can move linearly. FIGS. 1 and 2 illustrate a conventional electric actuator including an outer cylinder 10, a sliding unit 12 accommodated in the outer cylinder 10, and a screw shaft 14. Two guiding grooves 16 opposite to each other are provided on an interior wall of the outer cylinder 10. The sliding unit 12 includes a sliding seat 18, a nut member 20 and an output shaft 22. The sliding seat 18 includes first and second ends 24 and 26 spaced from each other in a longitudinal direction and has a through-hole 28 extending in the longitudinal direction therein. The nut member 20 is fixed at the first end 24 of the sliding seat 18 by screws 30, and one end of the output shaft 22 is combined with the second end 26 of the sliding seat 18, so that the sliding seat 18, the nut member 20 and the output shaft 22 can move in the longitudinal direction together in the outer cylinder 10. The interior wall of the nut member 20 has a spiral inner groove 32. The outer segment of the screw shaft 14 passes through the nut member 20 and the through-hole 28 of the sliding seat 18, and a spiral outer groove 34 is formed in the outer periphery of the screw shaft 14. Balls 36 are arranged between the outer groove 34 and the inner groove 32 of the nut member 20, so that when the screw shaft 14 rotates, the nut member 20 is driven to move in the longitudinal direction with respect to the screw shaft 14. In this embodiment, the inner segment of the screw shaft 14 is engaged on a mounting seat 38. The mounting seat 38 can be coupled to a motor (not shown), and the screw shaft 14 can be connected with a rotating shaft of the motor (not shown), so that the screw shaft 14 can be driven by the motor. In addition, two opposite guiding blocks 40 are provided on the outer periphery of the sliding seat 18 and respectively located in the guiding grooves 16 of the outer cylinder 10, so that the sliding seat 18 and the output shaft 22 do not rotate when they move with respect to the screw shaft 14 in the longitudinal direction.

However, the sliding unit 12 has many components, which is time-consuming to assemble, and the combination of multiple components easily produces tolerances, which reduces the accuracy of the linear motion of the sliding unit 12 and negatively affects the operating accuracy of the electric actuator. Furthermore, the guiding blocks 40 are connected with the sliding seat 18 by screws 42, resulting in a complicated structure of the sliding unit 12. In addition, the locking of the screws 42 may cause the position of the guiding blocks 40 to deviate, which has an adverse effect to smoothly place the guiding block 40 into the guiding groove 16, and will produce assembly tolerances, causing the movement of the sliding seat 18 to be unsmooth or shaking, negatively affecting the stability of the linear motion of the sliding unit 12.

BRIEF SUMMARY OF THE INVENTION

Thus, an objective of the present invention is to provide an electric actuator that integrates the sliding seat and the nut member of the conventional sliding unit into one body to simplify the structure of the electric actuator, facilitate assembly and reduce assembly tolerances, thereby improving the operating accuracy of the electric actuator. Further, the rotation-restricting member of the electric actuator is designed to prevent the sliding unit from rotating during movement and to facilitate the assembly of the rotation-restricting member and the outer cylinder.

To achieve this and other objectives, an electric actuator according to an embodiment of the present invention includes an outer cylinder, a sliding unit and a screw shaft. The outer cylinder has an accommodating hole therein. The accommodating hole extends in a longitudinal direction and has a hole wall provided with at least one guiding groove extending in the longitudinal direction. The sliding unit includes a nut member, a rotation-restricting member, and an output shaft. The nut member has a penetrating hole extending in the longitudinal direction therein and further has a first end and a second end spaced from the first end in the longitudinal direction. The rotation-restricting member is engaged on the first end of the nut member and includes an annular body with a through-hole therein. At least one guiding block is provided on an outer periphery of the annular body of the rotation-restricting member and combined in the guiding groove of the outer cylinder. The output shaft is engaged on the second end of the nut member. The screw shaft is connected with the nut member in a relatively movable manner and includes inner and outer segments spaced from each other in the longitudinal direction. The inner segment of the screw shaft is adapted to be connected with a driving member to drive the screw shaft to rotate. The outer segment of the screw shaft extends through the through-hole of the rotation-restricting member and the penetrating hole of the nut member. When the screw shaft rotates, the nut member, the rotation-restricting member and the output shaft move in the longitudinal direction with respect to the screw shaft, and the at least one guiding block of the rotation-restricting member moves inside the at least one guiding groove in the longitudinal direction to restrict the nut member and the output shaft from rotating with respect to the outer cylinder.

In a preferred form, the penetrating hole of the nut member has a hole wall provided with a spiral inner groove therein, the screw shaft has an outer periphery provided with a spiral outer groove therein, and balls are arranged between the outer groove of the screw shaft and the inner groove of the nut member, so that when the screw shaft rotates, the nut member is driven to move in the longitudinal direction with respect to the screw shaft. An enlarged opening is provided in the penetrating hole of the first end of the nut member and accommodates a barrier ring.

In a preferred form, the nut member has an outer periphery provided with at least one coupling groove therein, the annular body includes first and second surfaces facing away from each other in the longitudinal direction, and the first surface has at least one coupling portion for coupling in the at least one coupling groove of the nut member.

In a preferred form, the coupling groove is an annular groove and adjacent to the first end of the nut member, the first surface of the annular body has a plurality of coupling portions spaced from each other in a circumference direction thereof, and each coupling portion extends in the longitudinal direction and has a hook portion coupling in the coupling groove.

In a preferred form, the hole wall of the accommodating hole is provided with a plurality of guiding grooves spaced from each other in a circumference direction thereof, the outer periphery of the annular body has a plurality of guiding blocks spaced from each other in a circumference direction thereof, and each guiding block is movably combined in a corresponding guiding groove of the outer cylinder. The guiding block extends in the longitudinal direction and has two end portions spaced from each other in the longitudinal direction, and each end portion has a notch and two guiding arms separated by the notch. The end portion of the guiding block has a first width in a width direction, the guiding groove has a second width in the width direction, and the first width is equal to or slightly larger than the second width. An arc-shaped recess is provided in a side of the guiding block.

In a preferred form, the second surface of the annular body has a plurality of positioning portions spaced from each other in a circumference direction thereof, and each positioning portion extends in the longitudinal direction. The sliding unit further include an annular magnet arranged on the second surface of the annular body and positioned between the plurality of positioning portions and the at least one guiding block.

The present invention will become clearer in light of the following detailed description of an illustrative embodiment of this invention described in connection with the drawings.

DETAILED DESCRIPTION OF THE INVENTION

The present invention may have embodiments with a variety of different structures. With regard to the optimal structure of the present invention, we shall describe a specific embodiment only as an example not as a limitation as follows with reference to the figures.

Figure 1:
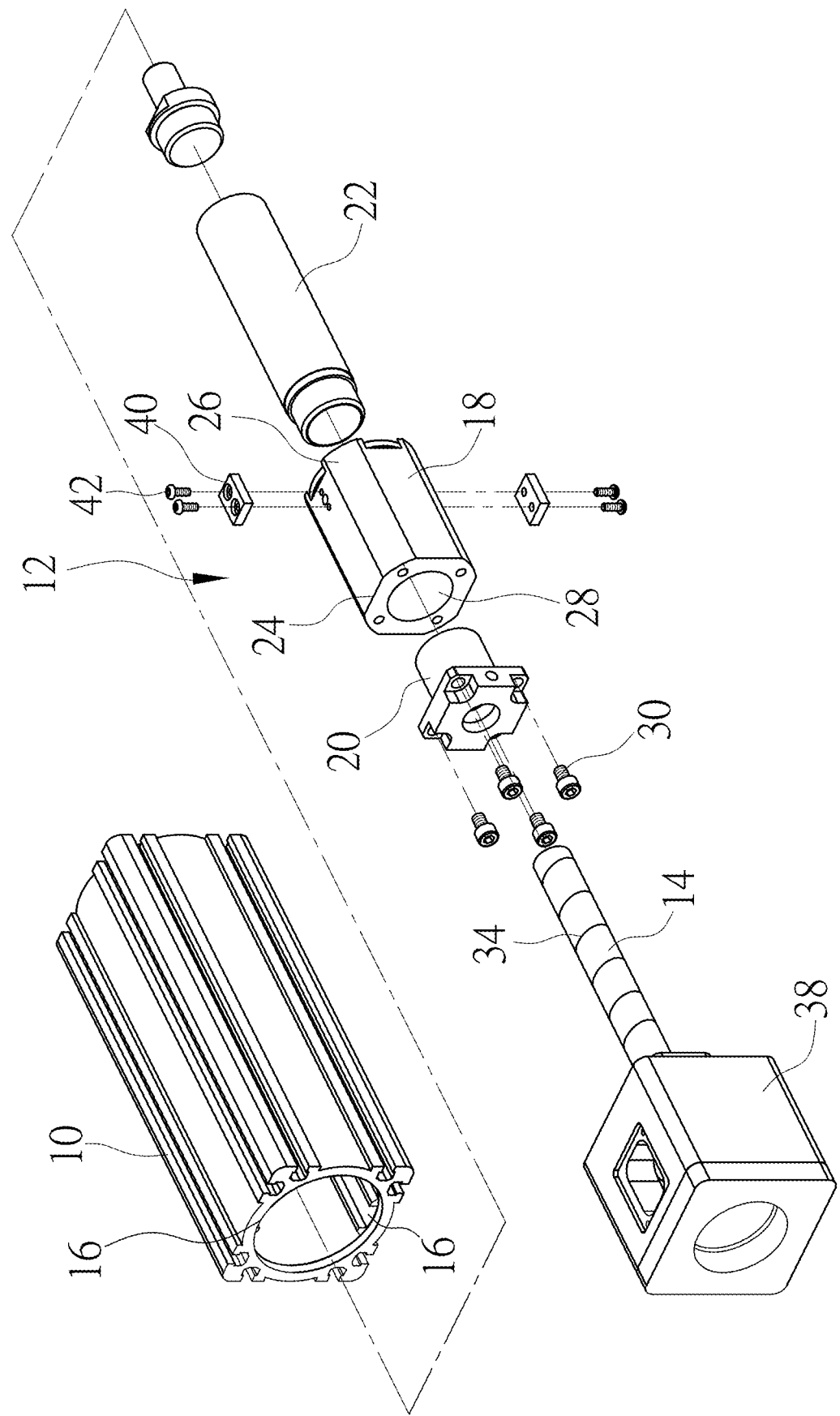
FIG. 1 is an exploded view of some components of a conventional electric actuator.
Figure 2:
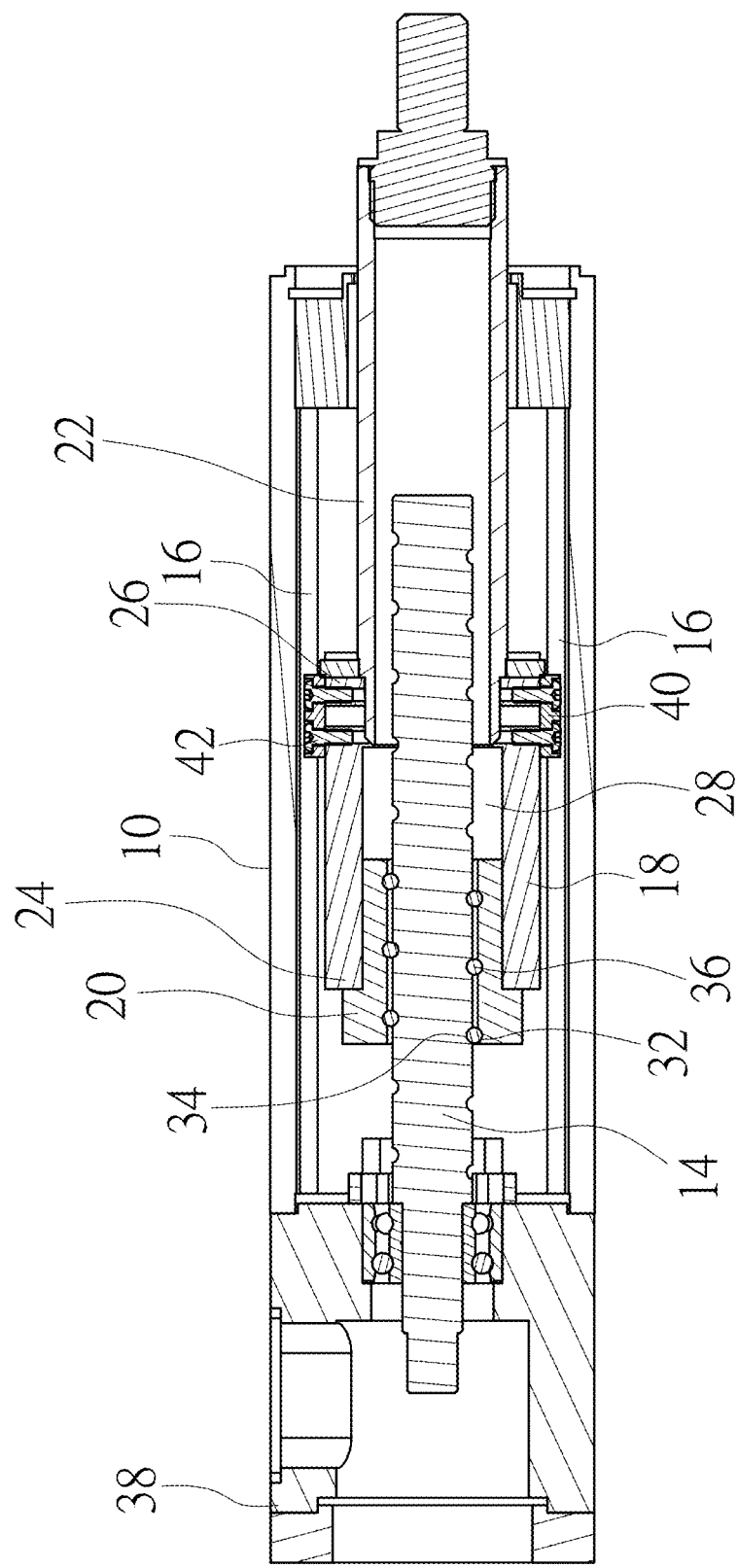
FIG. 2 is a combined cross-sectional view of the electric actuator in FIG. 1.
Figure 3:
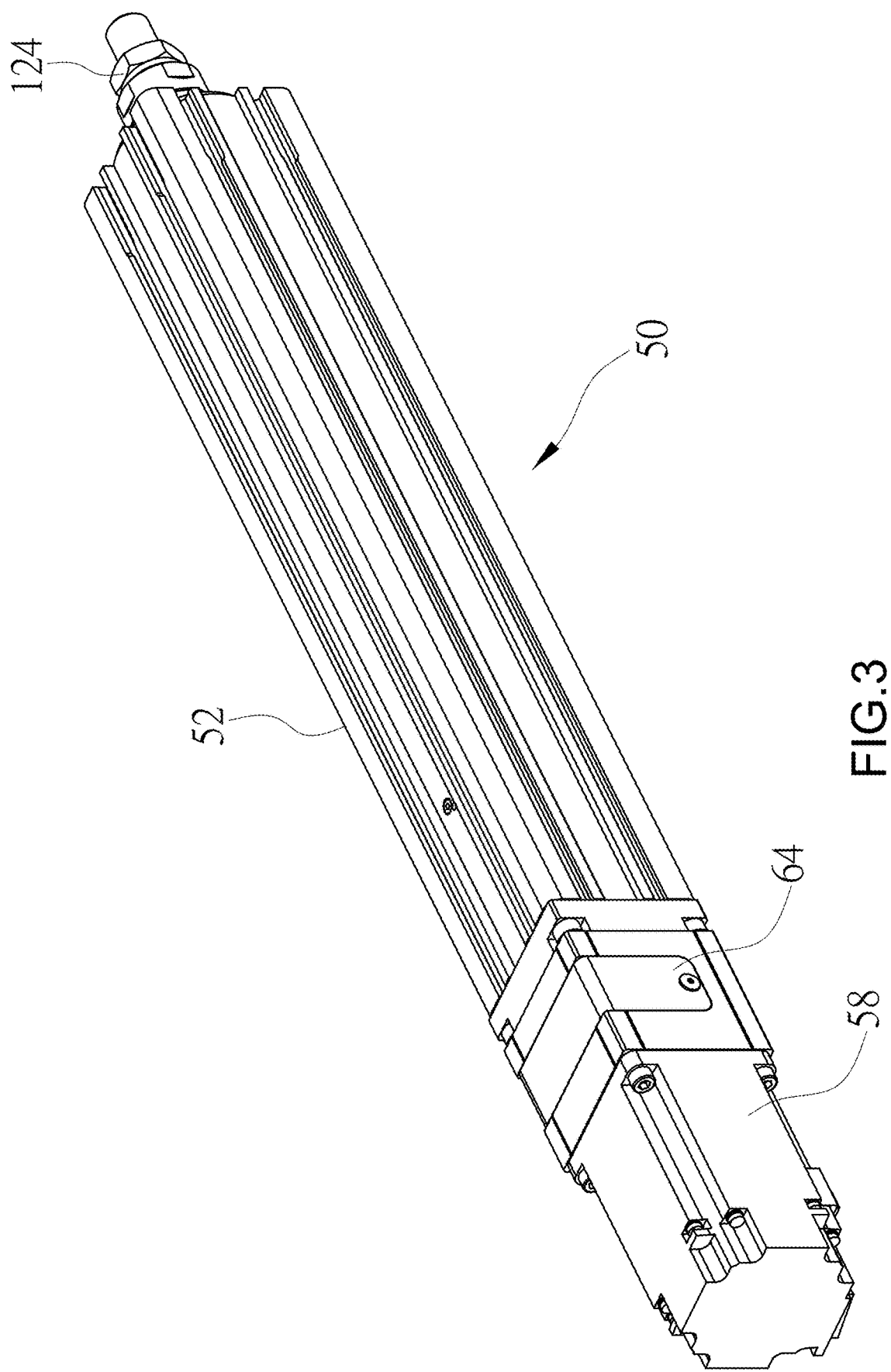
FIG. 3 is a perspective view of an electric actuator according to an embodiment of the present invention.
Figure 4:
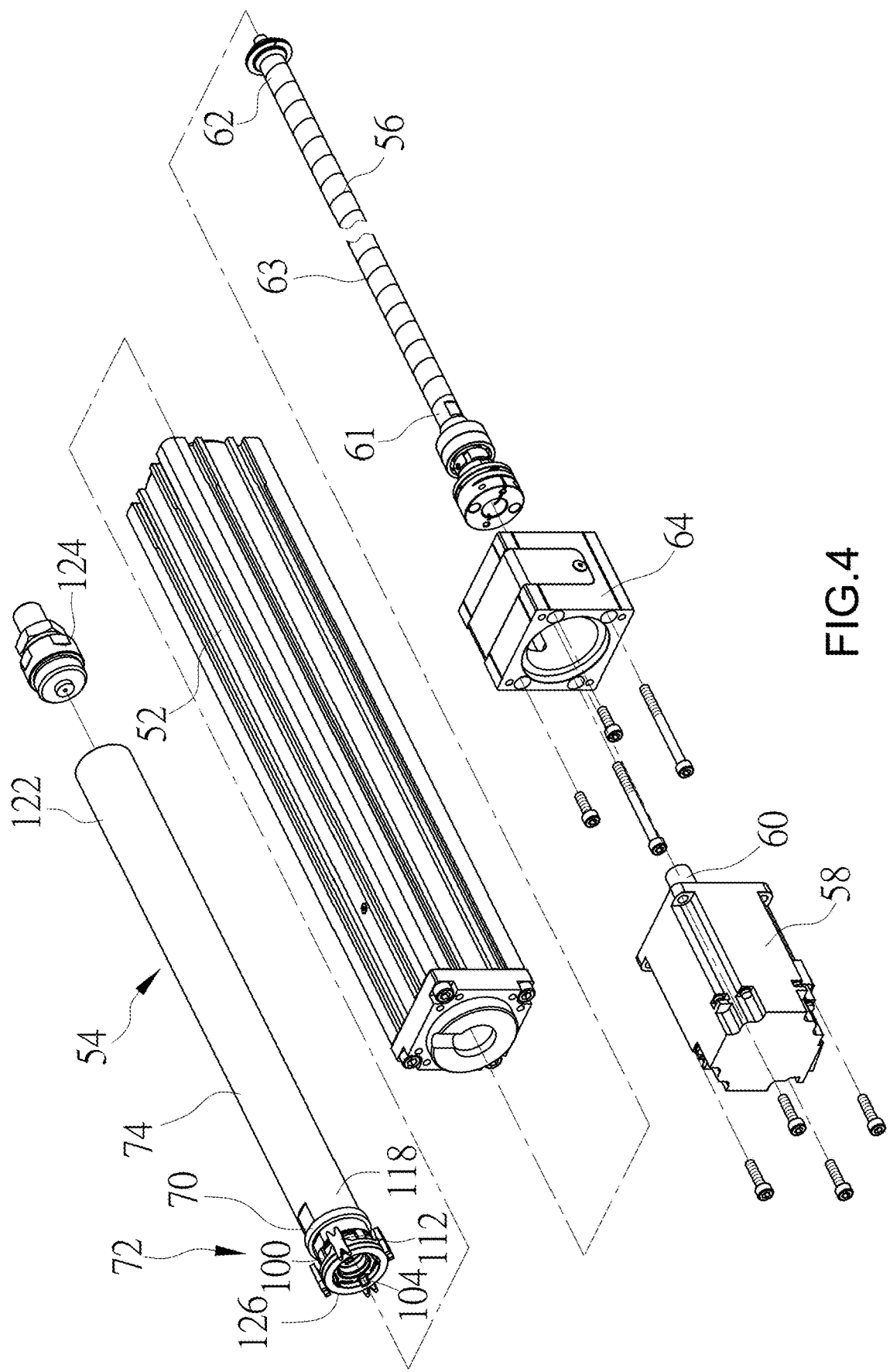
FIG. 4 is an exploded view of most components of the electric actuator in FIG. 3.
Figure 5:
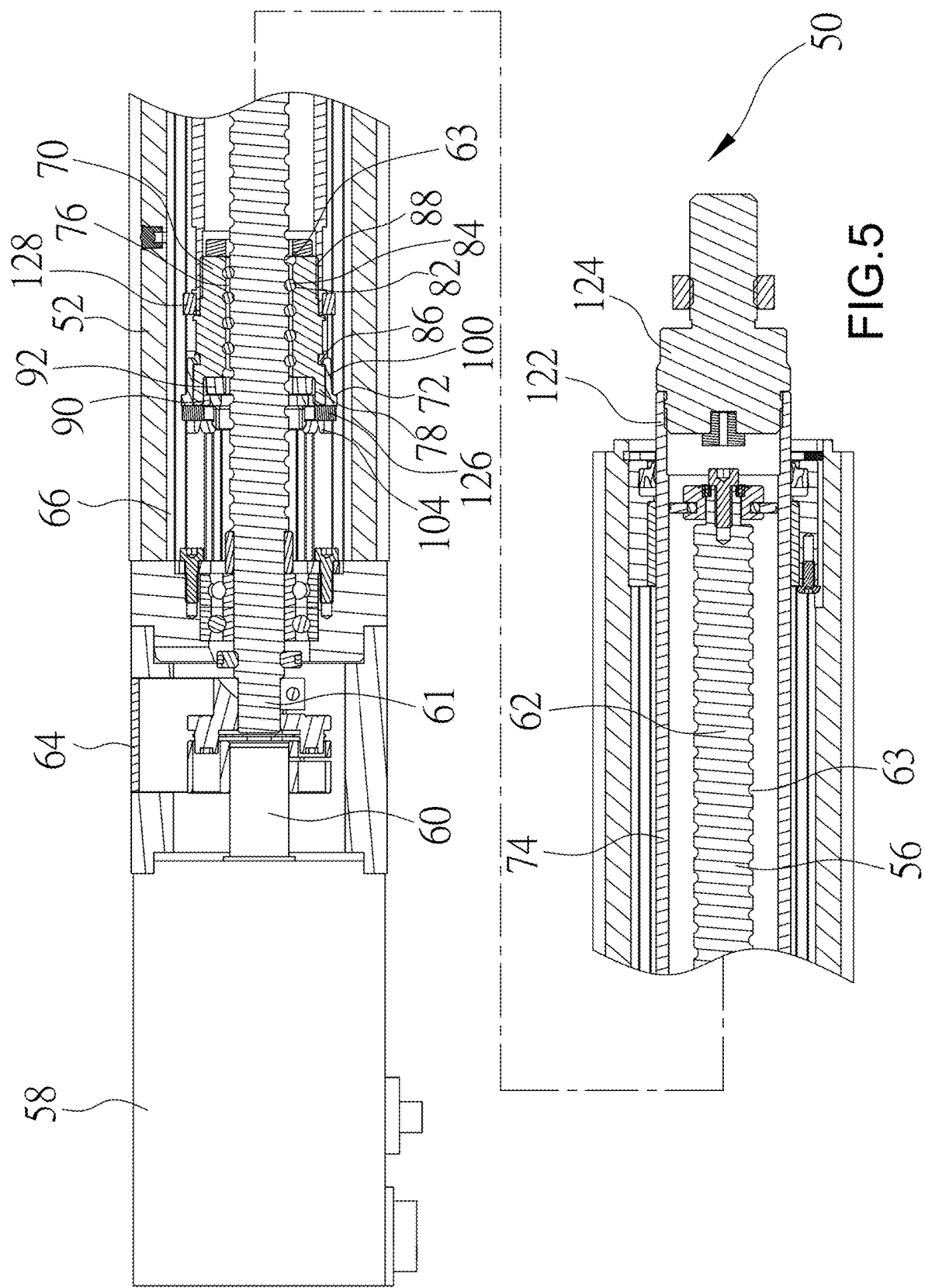
FIG. 5 is a longitudinal cross-sectional view of the electric actuator in FIG. 3.
Figure 6:
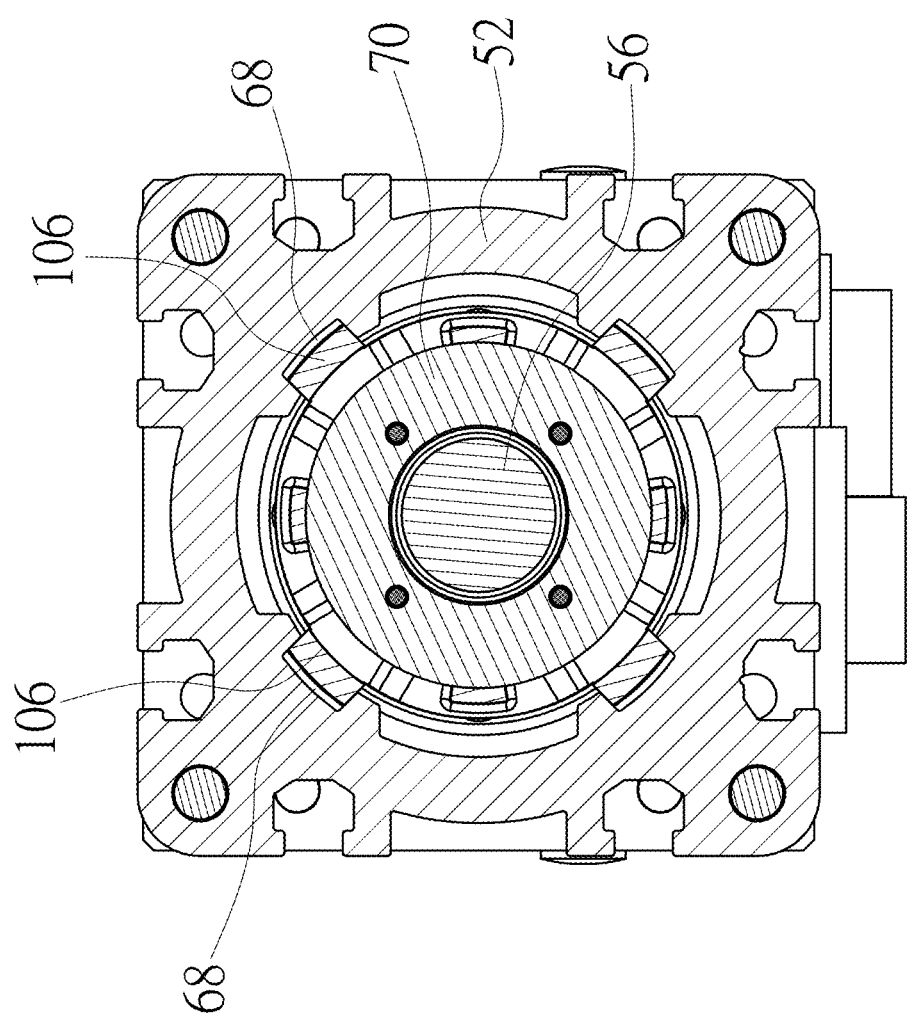
FIG. 6 is a transversal cross-sectional view of the electric actuator in FIG. 3.

An electric actuator 50 according to the preferred teachings of the present invention is shown in FIGS. 3-10 of the drawings and generally includes an outer cylinder 52, a sliding unit 54 and a screw shaft 56 both accommodated in the outer cylinder 52. The screw shaft 56 is driven by a driving member such as a motor 58 to drive the sliding unit 54 to move linearly inside the outer cylinder 52. The motor 58 may be, for example, a servomotor or a step motor, and the motor 58 has a rotating shaft 60. In this embodiment, the screw shaft 56 is, for example, a ball screw shaft and includes an inner segment 61 and an outer segment 62 spaced from the inner segment 61 in a longitudinal direction. A spiral outer groove 63 is provided on an outer periphery of the screw shaft 56. The inner segment 61 of the screw shaft 56 is engaged on a mounting seat 64 and connected with the rotating shaft 60 of the motor 58, so that the screw shaft 56 can be driven to rotate by the motor 58. The mounting seat 64 is connected between the motor 58 and the outer cylinder 52. The outer cylinder 52 has an accommodating hole 66 therein for accommodating the sliding unit 54 and the screw shaft 56 (referring to FIG. 5). A plurality of guiding grooves 68 spaced from each other in a circumference direction and extending in the longitudinal direction are arranged in a hole wall of the accommodating hole 66 (the inner wall of the outer cylinder 52). In this embodiment, the inner wall of the outer cylinder 52 is provided with four guiding grooves 68 (FIG. 6).

Figure 8:
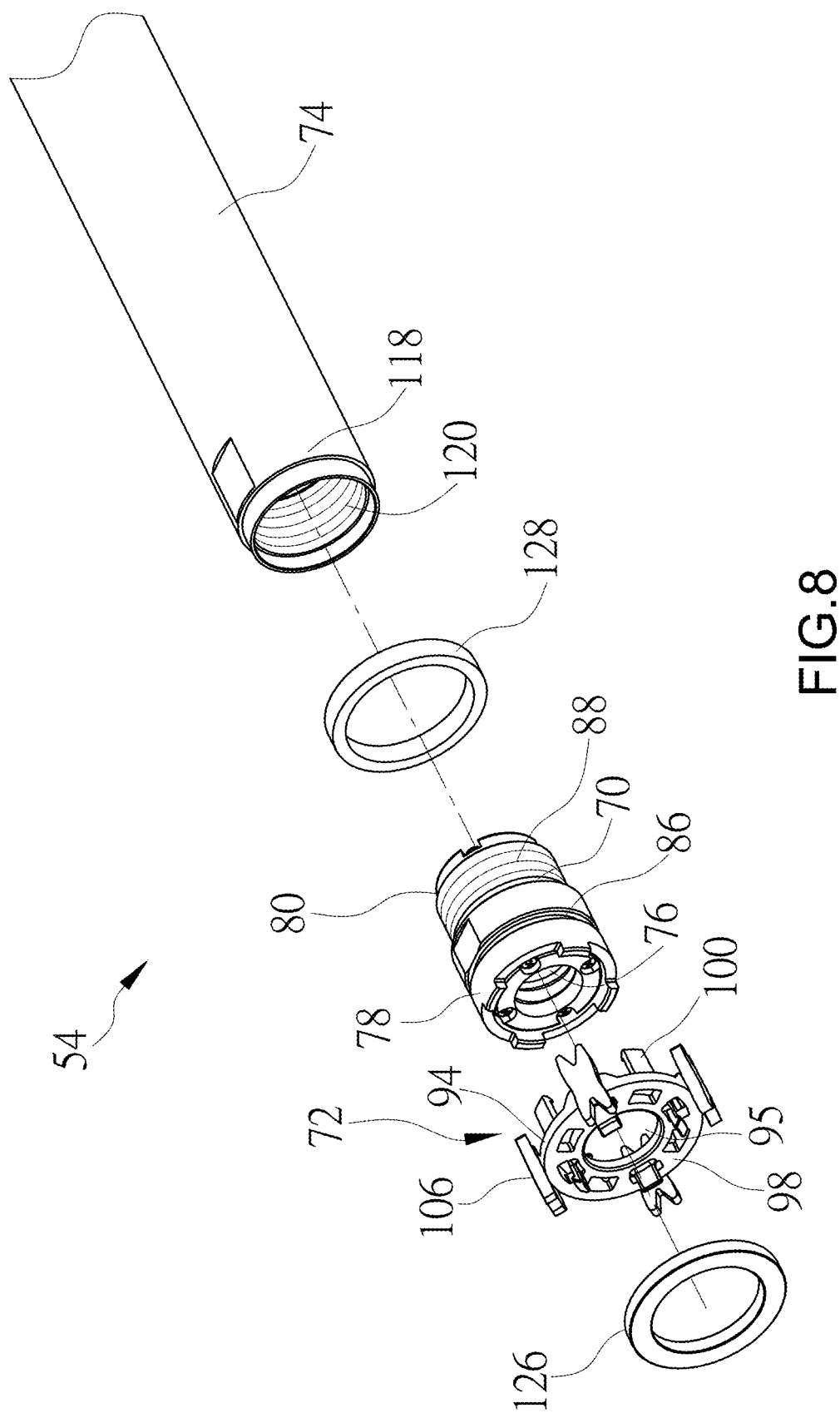
FIG. 8 is an exploded view of the sliding unit in FIG. 4.
Figure 9:
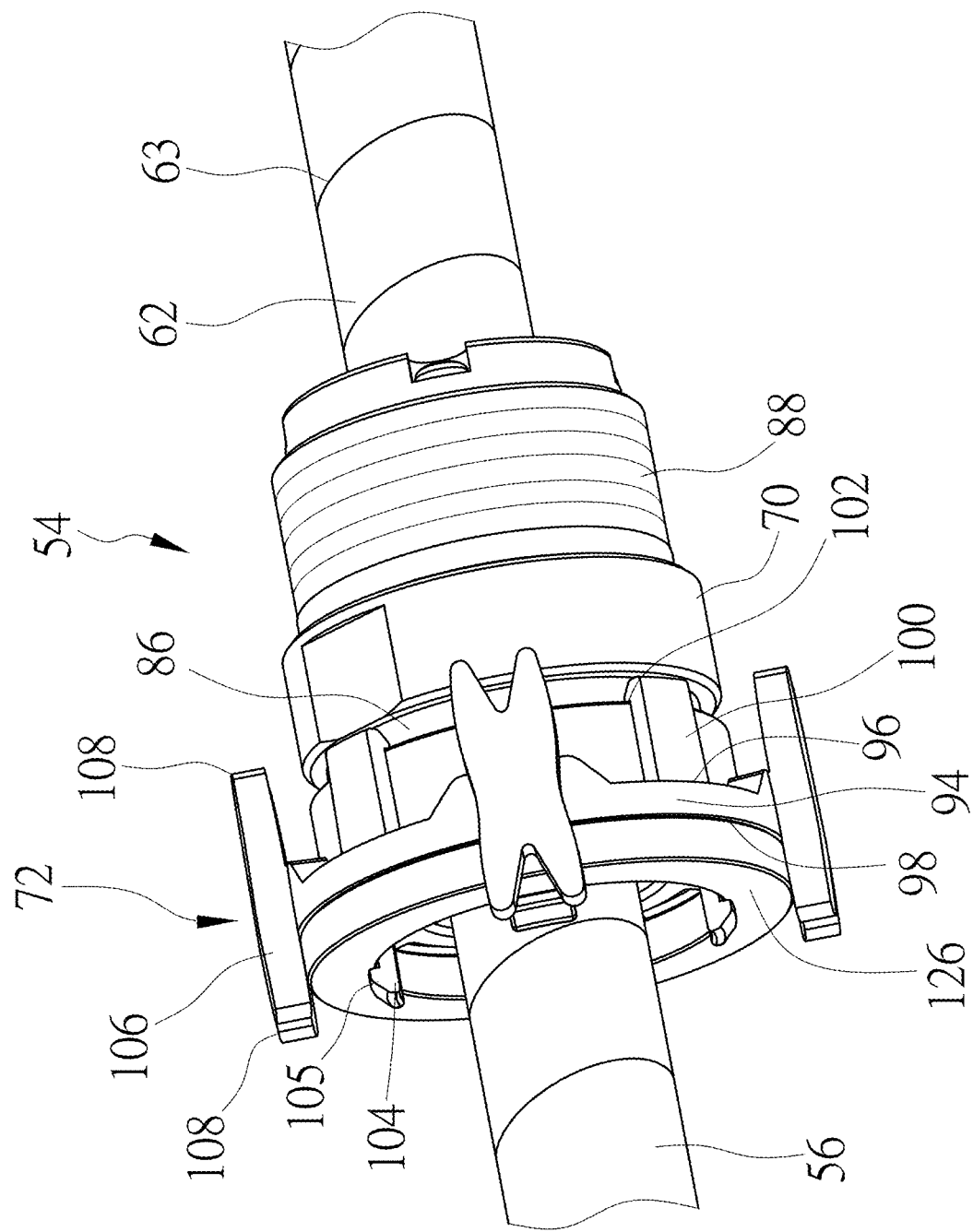
FIG. 9 is a schematic diagram showing the screw shaft in FIG. 4 passing through a nut member and a rotation-restricting member of the sliding unit.

The technical feature of the present invention lies in the sliding unit 54. The sliding unit 54 includes a nut member 70, a rotation-restricting member 72, and an output shaft 74 (FIGS. 8 and 9). The nut member 70 is generally cylindrical and has a penetrating hole 76 extending in the longitudinal direction therein. The nut member 70 further has a first end 78 and a second end 80 spaced from the first end 78 in the longitudinal direction. The hole wall of the penetrating hole 76 of the nut member 70 is provided with a spiral inner groove 82 (FIG. 5), and the outer segment 62 of the screw shaft 56 extends through the penetrating hole 76 of the nut member 70. Balls 84 are arranged between the inner groove 82 and the outer groove 63 of the screw shaft 56, so that when the screw shaft 56 rotates, the nut member 70 is driven to move in the longitudinal direction with respect to the screw shaft 56. In addition, at least one coupling groove 86 is provided in the outer periphery of the nut member 70 for being coupled by the rotation-restricting member 72 (FIG. 9). In this embodiment, the coupling groove 86 is an annular groove and adjacent to the first end 78 of the nut member 70. The second end 80 of the nut member 70 is provided with an external thread 88 for coupling with the output shaft 74. Furthermore, an enlarged opening 90 is provided in the penetrating hole 76 of the first end 78 of the nut member 70, and a barrier ring 92 is accommodated in the opening 90 to avoid the balls 84 from disengaging (FIG. 5).

Figure 10:
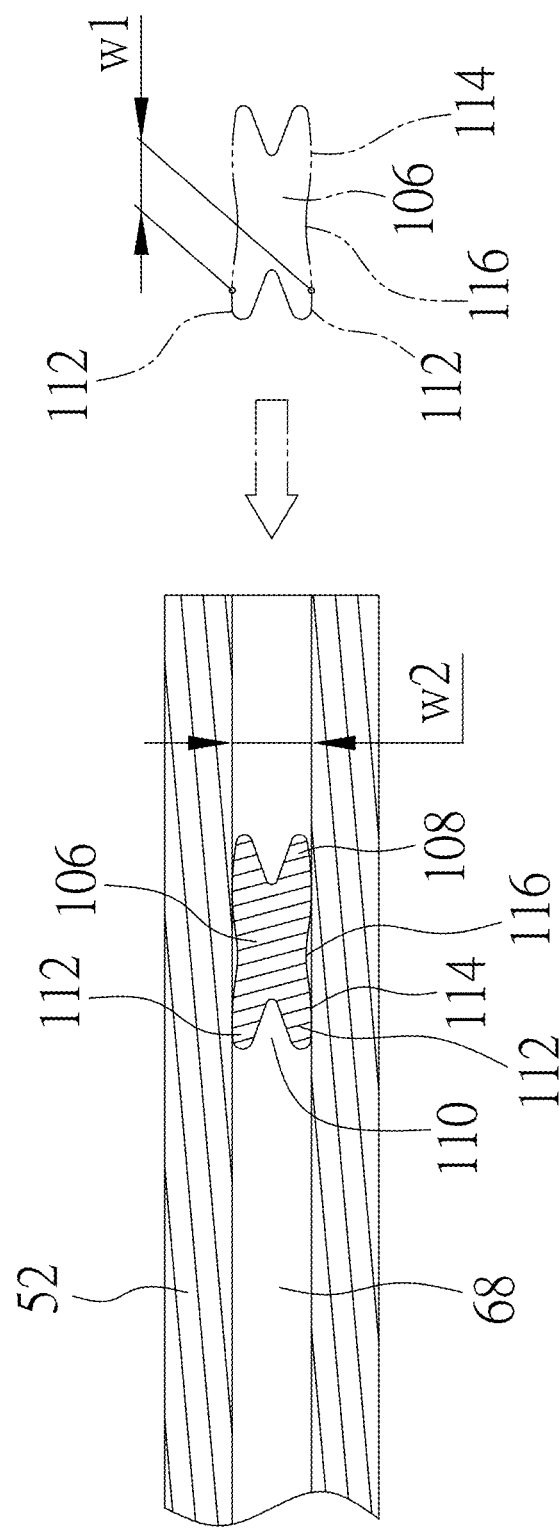
FIG. 10 is an assembly diagram showing a guiding block of the rotation-restricting member fitting into a guiding groove of the outer cylinder.

As shown in FIGS. 8-9, the rotation-restricting member 72 is engaged on the first end 78 of the nut member 70 and includes an annular body 94 with a through-hole 95 therein for the screw shaft 56 to pass through. The annular body 94 includes first and second surfaces 96 and 98 facing away from each other in the longitudinal direction. The first surface 96 has at least one coupling portion 100 for coupling in the coupling groove 86 of the nut member 70. In this embodiment, the first surface 96 of the annular body 94 has a plurality of coupling portions 100 spaced from each other in a circumference direction thereof, with each coupling portion 100 extending in the longitudinal direction and having a hook portion 102 for coupling in the coupling groove 86. The second surface 98 has a plurality of positioning portions 104 spaced from each other in the circumference direction thereof, with each positioning portion 104 extending in the longitudinal direction and having a hook portion 105. In addition, the outer periphery of annular body 94 has at least one guiding block 106 for coupling in the guiding groove 68 of the outer cylinder 52. In this embodiment, the outer periphery of the annular body 94 is provided with four guiding blocks 106 spaced from each other in the circumference direction thereof, and each guiding block 106 fits in a corresponding guiding groove 68 of the outer cylinder 52 (FIG. 6). When the nut member 70 moves in the longitudinal direction with respect to the screw shaft 56, the guiding block 106 moves inside the corresponding guiding grooves 68 in the longitudinal direction. In this embodiment, the guiding block 106 extends in the longitudinal direction and has two end portions 108 spaced from each other in the longitudinal direction, and each end portion 108 has a notch 110 and two guiding arms 112 separated by the notch 110 (FIG. 10). In this embodiment, the notch 110 forms an enlarged opening in the end face of the end portion 108 and has a V-shaped cross-section. The end portion 108 of the guiding block 106 has a first width (w1) in a width direction, and the guiding groove 68 has a second width (w2). The first width (w1) is equal to or slightly larger than the second width (w2), so that after compressing the two guiding arms 112 of the end portion 108, the guiding block 106 can be fittingly placed in the guiding groove 68 and in contact with the guiding groove 68. Accordingly, when the nut member 70 moves in the longitudinal direction with respect to the screw shaft 56, the nut member 70 and the rotation-restricting member 72 cannot rotate with respect to the outer cylinder 52. In addition, an arc-shaped recess 116 is provided in the middle of a side 114 of the guiding block 106 to reduce the friction between the guiding block 106 and the groove wall of the guiding groove 68, thereby ensuring that the guiding block 106 can slide smoothly inside the guiding groove 68, and the rotation-restricting member 72 can maintain the function of not rotating with respect to the outer cylinder 52 even after long-term use. In this embodiment, the rotation-restricting member 72 is made of wear-resisting material.

Figure 7:
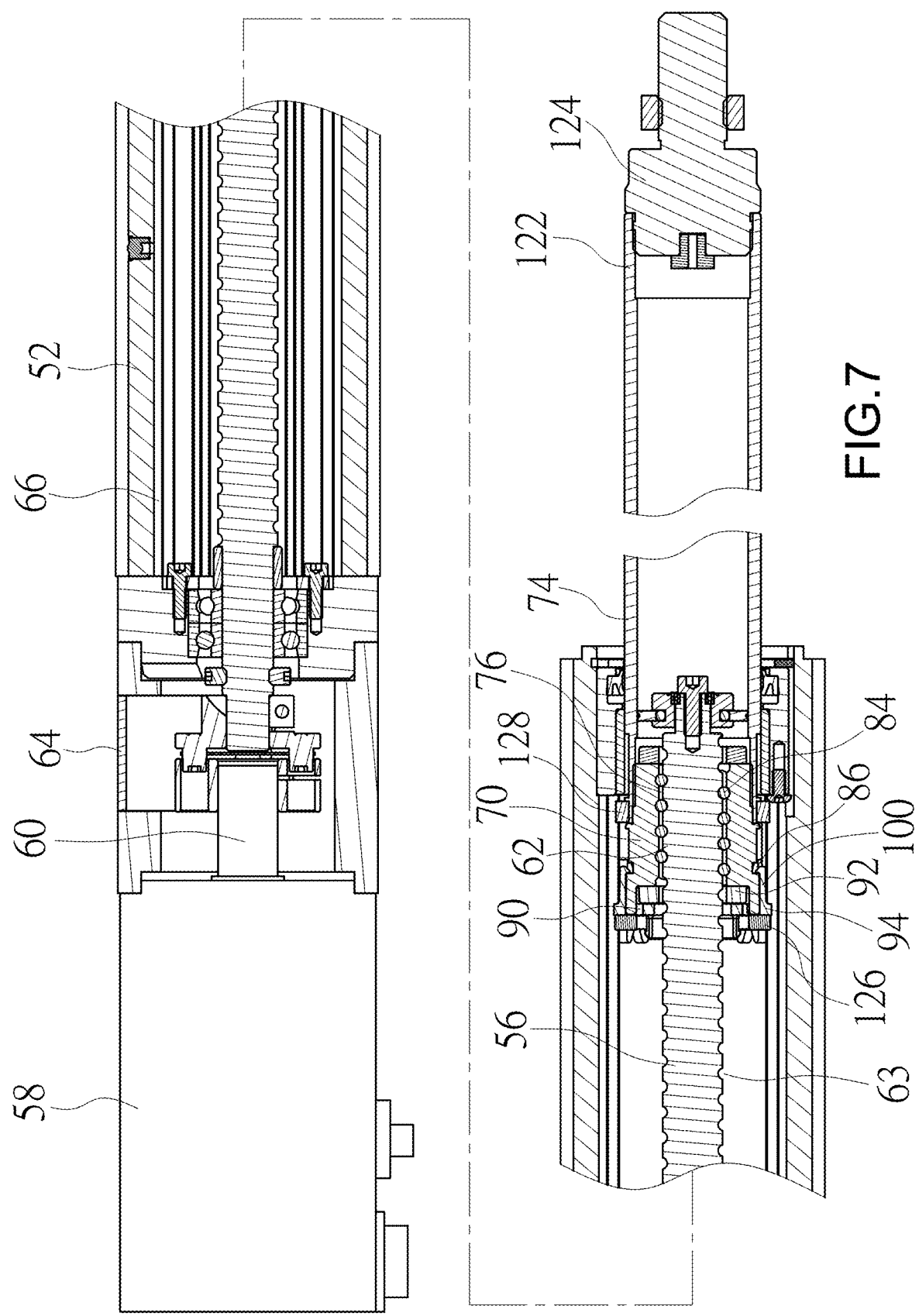
FIG. 7 is a schematic diagram showing a sliding unit in FIG. 5 moving outward with respect to a screw shaft.

As shown in FIGS. 7-8, the output shaft 74 is a cylindrical hollow rod, and its inner end 118 is combined with the second end 80 of the nut member 70, so that when the screw shaft 56 rotates, the output shaft 74 and the nut member 70 can move in the longitudinal direction together. In this embodiment, the inner end 118 of the output shaft 74 is provided with an internal thread 120 that can be screwed with the external thread 88 of the nut member 70. The outer segment 62 of the screw shaft 56 passes through the penetrating hole 76 of the nut member 70 and is located in the output shaft 74. In this embodiment, an outer end 122 of the output shaft 74 is connected with a connector 124 for connecting the object driven by the electric actuator 50.

In this embodiment, the sliding unit 54 further includes an annular magnet 126 and an anti-collision ring 128 which is used to avoid the nut member 70 from collision at the time of moving outward to a limit position. The magnet 126 is arranged on the second surface 98 of the annular body 94 and positioned between the plurality of positioning portions 104 and the plurality of guiding blocks 106, and the magnet 126 is fixed by the hook portions 105 of the positioning portions 104 (FIG. 9). The magnet 126 can cooperate with a sensor (not shown) to sense the displaced position of the nut member 70. In an embodiment, the sensor is, for example, a magnetic reed switch, which is arranged on the outer cylinder 52.

In term of the operation of the electric actuator 50 according to the present invention, when the motor 58 rotates clockwise or counterclockwise, the screw shaft 56 will be driven to make the nut member 70 and the output shaft 74 to extend or retract in the longitudinal direction, and at this moment, by the movement of the guiding block 106 of the rotation-restricting member 72 in the guiding groove 68 of the outer cylinder 52, the nut member 70 and the output shaft 74 will not rotate with respect to the outer cylinder 52 during moving.

The sliding unit 54 according to the present invention has relatively few components (including the nut member 70, the rotation-restricting member 72, and the output shaft 74), which can effectively simplify the structure of the electric actuator 50, facilitate the assembly of the electric actuator 50 and reduce combination tolerance. Moreover, the rotation-restricting member 72 of the electric actuator 50 can be easily assembled with the nut member 70 and the outer cylinder 52, and can ensure the smooth sliding of the sliding unit 54 in the outer cylinder 52 and effectively prevent the sliding unit 54 from rotating during the sliding process, thereby improving the operating accuracy of the electric actuator 50.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. An electric actuator comprising:
   an outer cylinder having an accommodating hole therein, with the accommodating hole extending in a longitudinal direction and having a hole wall provided with at least one guiding groove extending in the longitudinal direction therein;
   a sliding unit including a nut member, a rotation-restricting member, and an output shaft, with the nut member having a penetrating hole extending in the longitudinal direction therein, with the nut member further having a first end and a second end spaced from the first end in the longitudinal direction, with the rotation-restricting member engaged on the first end of the nut member and including an annular body with a through-hole therein, with at least one guiding block provided on an outer periphery of the annular body of the rotation-restricting member and combined in the at least one guiding groove of the outer cylinder, with the output shaft engaged on the second end of the nut member; and
   a screw shaft connected with the nut member in a relatively movable manner and including inner and outer segments spaced from each other in the longitudinal direction, with the inner segment of the screw shaft adapted to be connected with a driving member to drive the screw shaft to rotate, with the outer segment of the screw shaft extending through the through-hole of the rotation-restricting member and the penetrating hole of the nut member, wherein when the screw shaft rotates, the nut member, the rotation-restricting member and the output shaft move in the longitudinal direction with respect to the screw shaft, and the at least one guiding block of the rotation-restricting member moves inside the at least one guiding groove in the longitudinal direction to restrict the nut member and the output shaft from rotating with respect to the outer cylinder,
   wherein the penetrating hole of the nut member has a hole wall provided with a spiral inner groove therein, the screw shaft has an outer periphery provided with a spiral outer groove therein, and balls are arranged between the outer groove of the screw shaft and the inner groove of the nut member, so that when the screw shaft rotates, the nut member is driven to move in the longitudinal direction with respect to the screw shaft, wherein an enlarged opening is provided in the penetrating hole of the first end of the nut member and accommodates a barrier ring.

2. The electric actuator as claimed in claim 1, wherein the nut member has an outer periphery provided with at least one coupling groove therein, the annular body of the rotation-restricting member includes first and second surfaces facing away from each other in the longitudinal direction, and the first surface has at least one coupling portion coupling in the at least one coupling groove of the nut member.

3. An electric actuator comprising:
an outer cylinder having an accommodating hole therein, with the accommodating hole extending in a longitudinal direction and having a hole wall provided with at least one guiding groove extending in the longitudinal direction therein;
a sliding unit including a nut member, a rotation-restricting member, and an output shaft, with the nut member having a penetrating hole extending in the longitudinal direction therein, with the nut member further having a first end and a second end spaced from the first end in the longitudinal direction, with the rotation-restricting member engaged on the first end of the nut member and including an annular body with a through-hole therein, with at least one guiding block provided on an outer periphery of the annular body of the rotation-restricting member and combined in the at least one guiding groove of the outer cylinder, with the output shaft engaged on the second end of the nut member; and
a screw shaft connected with the nut member in a relatively movable manner and including inner and outer segments spaced from each other in the longitudinal direction, with the inner segment of the screw shaft adapted to be connected with a driving member to drive the screw shaft to rotate, with the outer segment of the screw shaft extending through the through-hole of the rotation-restricting member and the penetrating hole of the nut member, wherein when the screw shaft rotates, the nut member, the rotation-restricting member and the output shaft move in the longitudinal direction with respect to the screw shaft, and the at least one guiding block of the rotation-restricting member moves inside the at least one guiding groove in the longitudinal direction to restrict the nut member and the output shaft from rotating with respect to the outer cylinder,
wherein the nut member has an outer periphery provided with at least one coupling groove therein, the annular body of the rotation-restricting member includes first and second surfaces facing away from each other in the longitudinal direction, and the first surface has at least one coupling portion coupling in the at least one coupling groove of the nut member,
wherein the coupling groove is an annular groove and adjacent to the first end of the nut member, the first surface of the annular body has a plurality of coupling portions spaced from each other in a circumference direction thereof, and each coupling portion extends in the longitudinal direction and has a hook portion coupling in the coupling groove.

4. The electric actuator as claimed in claim 1, wherein the hole wall of the accommodating hole is provided with a plurality of guiding grooves spaced from each other in a circumference direction thereof, the outer periphery of the annular body has a plurality of guiding blocks spaced from each other in a circumference direction thereof, and each guiding block is movably combined in a corresponding guiding groove of the outer cylinder.

5. The electric actuator as claimed in claim 4, wherein the guiding block extends in the longitudinal direction and has two end portions spaced from each other in the longitudinal direction, and each end portion has a notch and two guiding arms separated by the notch.

6. The electric actuator as claimed in claim 5, wherein the end portion of the guiding block has a first width in a width direction, the guiding groove has a second width in the width direction, and the first width is equal to or slightly larger than the second width.

7. An electric actuator comprising:
an outer cylinder having an accommodating hole therein, with the accommodating hole extending in a longitudinal direction and having a hole wall provided with at least one guiding groove extending in the longitudinal direction therein;
a sliding unit including a nut member, a rotation-restricting member, and an output shaft, with the nut member having a penetrating hole extending in the longitudinal direction therein, with the nut member further having a first end and a second end spaced from the first end in the longitudinal direction, with the rotation-restricting member engaged on the first end of the nut member and including an annular body with a through-hole therein, with at least one guiding block provided on an outer periphery of the annular body of the rotation-restricting member and combined in the at least one guiding groove of the outer cylinder, with the output shaft engaged on the second end of the nut member; and
a screw shaft connected with the nut member in a relatively movable manner and including inner and outer segments spaced from each other in the longitudinal direction, with the inner segment of the screw shaft adapted to be connected with a driving member to drive the screw shaft to rotate, with the outer segment of the screw shaft extending through the through-hole of the rotation-restricting member and the penetrating hole of the nut member, wherein when the screw shaft rotates, the nut member, the rotation-restricting member and the output shaft move in the longitudinal direction with respect to the screw shaft, and the at least one guiding block of the rotation-restricting member moves inside the at least one guiding groove in the longitudinal direction to restrict the nut member and the output shaft from rotating with respect to the outer cylinder,
wherein the hole wall of the accommodating hole is provided with a plurality of guiding grooves spaced from each other in a circumference direction thereof, the outer periphery of the annular body has a plurality of guiding blocks spaced from each other in a circumference direction thereof, and each guiding block is movably combined in a corresponding guiding groove of the outer cylinder,
wherein an arc-shaped recess is provided in a side of the guiding block.

8. The electric actuator as claimed in claim 2, wherein the second surface of the annular body has a plurality of positioning portions spaced from each other in a circumference direction thereof, with each positioning portion extending in the longitudinal direction, wherein the sliding unit further include an annular magnet arranged on the second surface of the annular body and positioned between the plurality of positioning portions and the at least one guiding block.

* * * * *